(12) United States Patent
Nakanishi (10) Patent No.: US 11,320,604 B2
(45) Date of Patent: May 3, 2022

(54) OPTICAL CONNECTION COMPONENT

(71) Applicant: Sumitomo Electric Industries, Ltd., Osaka (JP)

(72) Inventor: Tetsuya Nakanishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/156,956

(22) Filed: Jan. 25, 2021

(65) Prior Publication Data

US 2021/0141164 A1 May 13, 2021

Related U.S. Application Data

(63) Continuation of application No. PCT/JP2019/029823, filed on Jul. 30, 2019.

(30) Foreign Application Priority Data

Aug. 1, 2018 (JP) .............................. JP2018-144677

(51) Int. Cl.
*G02B 6/38* (2006.01)
*G02B 6/36* (2006.01)
*G02B 6/42* (2006.01)

(52) U.S. Cl.
CPC ......... *G02B 6/3885* (2013.01); *G02B 6/3636* (2013.01); *G02B 6/3839* (2013.01); *G02B 6/423* (2013.01); *G02B 6/3829* (2013.01); *G02B 6/4285* (2013.01)

(58) Field of Classification Search
None
See application file for complete search history.

(56) References Cited

U.S. PATENT DOCUMENTS 9,297,963 B2 * 3/2016 Ohmura ............... G02B 6/3885
2003/0142922 A1 * 7/2003 Dallas .................... G02B 6/30
385/83

(Continued)

FOREIGN PATENT DOCUMENTS

JP 2007-147859 A 6/2007
JP 2011-048020 A 3/2011

(Continued)

OTHER PUBLICATIONS

International Search Report issued in Patent Application No. PCT/JP2019/029823 dated Oct. 8, 2019.

*Primary Examiner* — Jerry Rahll
(74) *Attorney, Agent, or Firm* — Pearne & Gordon LLP (57) ABSTRACT

An optical connection component includes: a glass plate formed of a glass material capable of transmitting ultraviolet rays, the glass plate having a first surface, a second surface opposite to the first surface, and one or a plurality of first through holes penetrating from the first surface to the second surface; a resin ferrule fixed to the first surface of the glass plate and having one or a plurality of second through holes each having a central axis coaxial with the central axis of the one or a plurality of first through holes; and one or a plurality of optical fibers including a glass fiber and a resin coating covering the outer periphery of the glass fiber, wherein the glass fiber exposed from the resin coating at the tip end of each of the one or a plurality of optical fibers is received in the one or a plurality of first through holes and the one or a plurality of second through holes.

10 Claims, 5 Drawing Sheets

(56) References Cited

U.S. PATENT DOCUMENTS

| | | | |
|---|---|---|---|
| 2006/0115217 A1* | 6/2006 | Childers | G02B 6/3839 385/53 |
| 2006/0269192 A1* | 11/2006 | Hayasaka | G02B 6/3834 385/60 |
| 2007/0031092 A1* | 2/2007 | Saitoh | G02B 6/4249 385/92 |
| 2009/0297099 A1* | 12/2009 | Benjamin | G02B 6/4257 385/32 |
| 2010/0329613 A1* | 12/2010 | Childers | G02B 6/3846 385/78 |
| 2011/0013870 A1 | 1/2011 | Marxer et al. | |
| 2011/0026882 A1* | 2/2011 | Budd | G02B 6/3885 385/52 |
| 2012/0121218 A1 | 5/2012 | Kim et al. | |
| 2015/0104135 A1* | 4/2015 | Bushnell | G02B 6/325 385/79 |
| 2018/0156987 A1 | 6/2018 | Nakanishi et al. | |
| 2018/0156990 A1 | 6/2018 | Chou et al. | |
| 2018/0292621 A1* | 10/2018 | Nanjo | G02B 6/426 |
| 2019/0033537 A1 | 1/2019 | Suematsu et al. | |
| 2020/0371298 A1* | 11/2020 | Nakama | G02B 6/3861 |
| 2021/0239915 A1* | 8/2021 | DeMerritt | B23K 26/402 |

FOREIGN PATENT DOCUMENTS

| | | |
|---|---|---|
| JP | 2016-090614 A | 5/2016 |
| WO | 2017/022085 A1 | 2/2017 |
| WO | 2017/170689 A1 | 10/2017 |

\* cited by examiner

OPTICAL CONNECTION COMPONENT

CROSS REFERENCE TO RELATED APPLICATION

This application IS A CONTINUATION OF International Application No. PCT/JP2019/029823, filed Jul. 30, 2019, which claims the priority to Japanese Patent Application No. 2018-144677, filed Aug. 1, 2018, the entirety of which is incorporated herein by reference.

BACKGROUND OF THE INVENTION

Technical Field

The present disclosure relates to an optical connection component.

BACKGROUND ART

JP 2007-147859A discloses a technique for changing an optical path direction by using an optical path conversion element made of resin, and WO2017/022085 discloses a technique for reducing height by using an optical connecting component made of glass.

SUMMARY OF THE INVENTION

An optical connection component according to an aspect of the present disclosure includes: a glass plate formed of a glass material capable of transmitting ultraviolet rays, the glass plate having a first surface, a second surface opposite to the first surface, and one or a plurality of first through holes penetrating from the first surface to the second surface; a resin ferrule fixed to the first surface of the glass plate, the resin ferrule having one or a plurality of second through holes having a center axis coaxially with the center axis of each of the one or a plurality of first through holes; and one or a plurality of optical fibers including a glass fiber and a resin coating covering the outer periphery of the glass fiber, wherein the glass fiber exposed from the resin coating at the tip ends of each of the one or a plurality of optical fibers is received in the one or a plurality of first through holes and the one or a plurality of second through holes.

DESCRIPTION OF THE EMBODIMENTS

An optical connection component includes an optical fiber and is used to optically connect an electronic substrate and an in-device optical wiring or an external optical transmission path).

With the miniaturization or the like of an optical module mounted on the electronic substrate, changing an optical path direction and reducing a height of the optical connection component are sometimes required. For example, JP2007-147859A discloses a technique for changing the optical path direction by using an optical path conversion element made of resin, and WO2017/022085 discloses a technique for reducing the height by using an optical connecting component made of glass.

However, since the optical path converting element described in JP2007-147859A is made of resin, it cannot transmit ultraviolet rays (hereinafter, referred to as UV). For this reason, it is difficult to fix the optical path conversion element to an optical integrated circuit (silicon photonic integrated circuits: hereinafter referred to as a Si—PIC) formed on a silicon substrate by using a UV-adhesive.

On the other hand, since the optical connecting component described in WO2017/022085 is made of glass, it is difficult to form a long through hole for passing an optical fiber with high accuracy.

The present disclosure has been made in view of the above-mentioned actual situation, and an object thereof is to provide an optical connection component which has a long through hole with high accuracy and can be fixed to an optical integrated circuit by using a UV adhesive.

According to the present disclosure, it is possible to fix optical fibers to optical integrated circuits such as Si—PIC with high accuracy by using a UV-adhesive.

First, the contents of embodiments of the present disclosure will be listed and described. An optical connection component according to an aspect of the present disclosure includes: a glass plate formed of a glass material capable of transmitting ultraviolet rays, the glass plate having a first surface, a second surface opposite to the first surface, and one or a plurality of first through holes penetrating from the first surface to the second surface; a resin ferrule fixed to the first surface of the glass plate, the resin ferrule having one or a plurality of second through holes having a central axis coaxially with the central axis of each of the one or a plurality of first through holes; and one or a plurality of optical fibers including a glass fiber and a resin coating covering the outer periphery of the glass fiber, wherein the glass fiber exposed from the resin coating at the tip ends of each of the one or a plurality of optical fibers is received in the one or a plurality of first through holes and the one or a plurality of second through holes. Since the glass plate is transparent to UV light, the optical connecting component can be fixed to an optical integrated circuit such as a Si—PIC by using a UV adhesive. Further, if the positioning structure to the optical integrated circuit is composed of glass plate and a resin ferrule fixed to the glass plate, a long through hole can be formed with high accuracy. Further, since the resin ferrule can be molded in various shapes, it is possible to easily respond to requirements for optical connection components such as changing the optical path direction and reducing the height of the optical connection component.

In one aspect of the optical connection component of the present disclosure, the opening of the one or a plurality of first through holes and the opening of the one or a plurality of second through holes are separated from each other. Since the glass plate side and the resin ferrule side are separated from each other, the shearing force due to the temperature change is hardly applied, and breakage of the glass fiber between the glass plate and the resin ferrule can be prevented.

In one aspect of the optical connection component of the present disclosure, a tensile stress applied to a portion disposed between the glass plate and the resin ferrule of the glass fiber is 2000 MPa or less. If the tensile stress applied to the portion of the glass fiber is 2000 MPa or less, it is possible to prevent breakage of the glass fiber even if there is a temperature change of −40° C. to 85° C.

In one aspect of the optical connection component of the present disclosure, the opening of the one or a plurality of first through holes and the opening of the one or a plurality of second through holes are larger than an outer diameter of the glass fiber. If the diameter of the first and second through holes is made larger than the outer diameter of the glass fiber, contact between the first and second through holes and the glass fiber can be easily avoided even if there is a temperature change of −40° C. to 85° C., which also contributes to prevent the breakage of the glass fiber.

In one aspect of the optical connection component of the present disclosure, the optical connection component has the plurality of first through holes two-dimensionally arranged in one cross section of the glass plate. Since the first through holes are a plurality of through holes arranged two-dimensionally, they can mount many optical fibers as compared with the case with a conventional V-groove substrate, mounting density of the fiber is improved.

In one aspect of the optical connection component of the present disclosure, the optical connection component includes the glass plate having the plurality of first through holes and the resin ferrule having the plurality of second through holes, the plurality of first through holes and the plurality of second through holes receive the plurality of glass fibers, and wherein the plurality of first through holes and the plurality of second through holes respectively face each other with a gap therebetween and an air gap is present in a region in contact with each of the plurality of glass fibers between the glass plate and the resin ferrule. Even when the difference between the thermal expansion coefficient of the glass plate and the thermal expansion coefficient of the resin ferrule is large, the shearing force is not applied to the glass fiber and the breakage of the glass fiber can be prevented.

In one aspect of the optical connection component of the present disclosure, a resin having a Young's modulus of 100 MPa or less is filled between the glass plate having the plurality of first through holes and the resin ferrule having the plurality of second through holes, except for a region in contact with each of the glass fibers. Even when the difference between the thermal expansion coefficient of the glass plate and the thermal expansion coefficient of the resin ferrule is large, the shearing force is not applied to the glass fiber and the breakage of the glass fiber can be prevented.

In one aspect of the optical connection component of the present disclosure, the glass plate and the resin ferrule each have guide holes positioned coaxially with each other. By utilizing the guide holes, the alignment of the first through holes and the second through holes is facilitated.

In one aspect of the optical connection component of the present disclosure, the outer diameter of the glass fiber is 100 μm or less. If an optical fiber with an outer diameter of 100 μm or less is used, both tensile strain and compressive strain can be small even if the glass fiber is bent. Therefore, this point also contributes to prevent the breakage of the glass fiber. In addition, the optical connection part can be easily reduced in height by using a resin ferrule that is molded in various shapes.

In one aspect of the optical connection component of the present disclosure, the one or a plurality of optical fibers are respectively one or plurality of multi-core optical fibers comprising a glass fiber having a plurality of cores in one cladding. By applying the multi-core optical fiber to the present structure, it is possible to realize an optical connection component having a high core density. Thus, it is possible to conform to a form that requires high-density optical input and output such as more than 100 ch from one Si—PIC.

Hereinafter, preferred embodiments of the optical connection component according to the present disclosure will be described with reference to the accompanying drawings.

Figure 1:
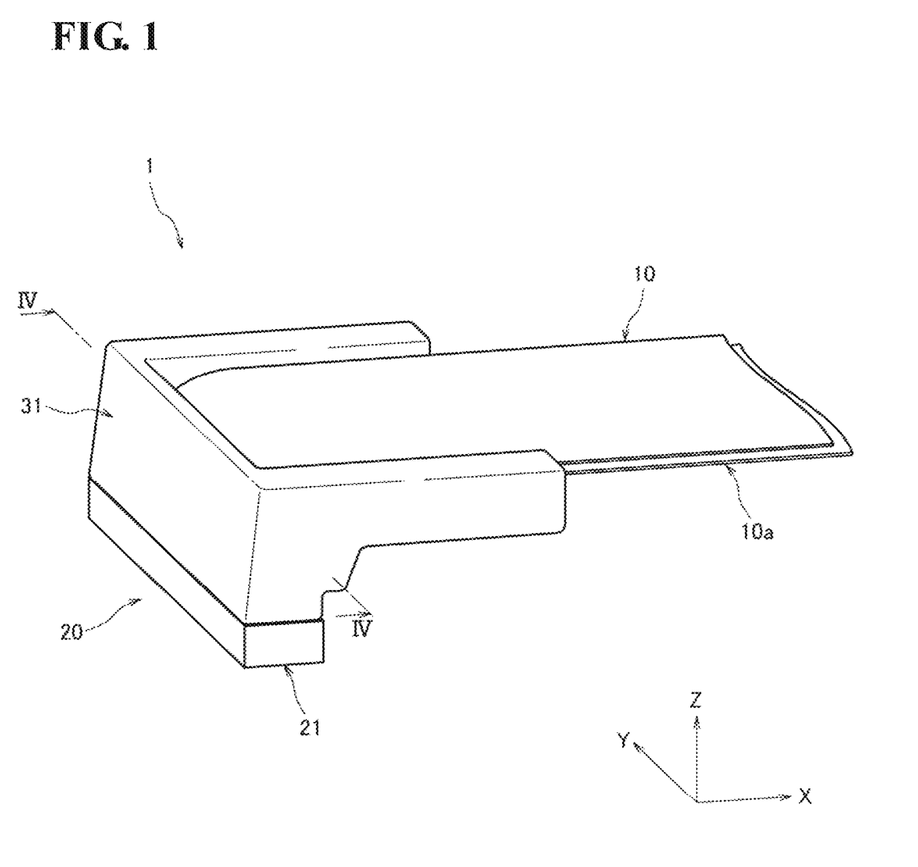
FIG. 1 is an external perspective view of an optical connection component according to a first embodiment of the present disclosure.
Figure 2:
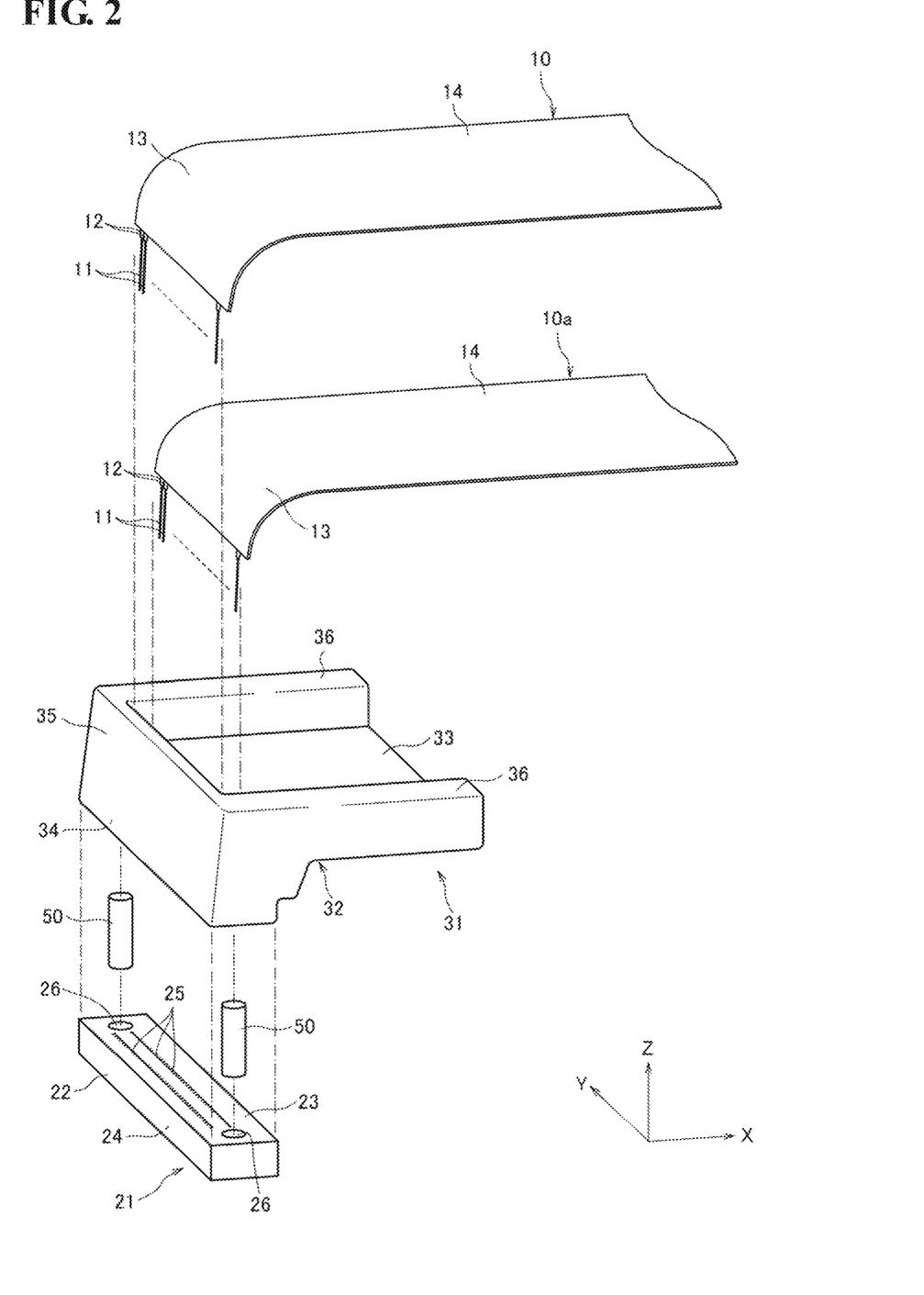
FIG. 2 is an exploded perspective view of the optical connection component illustrated in FIG. 1.
Figure 3:
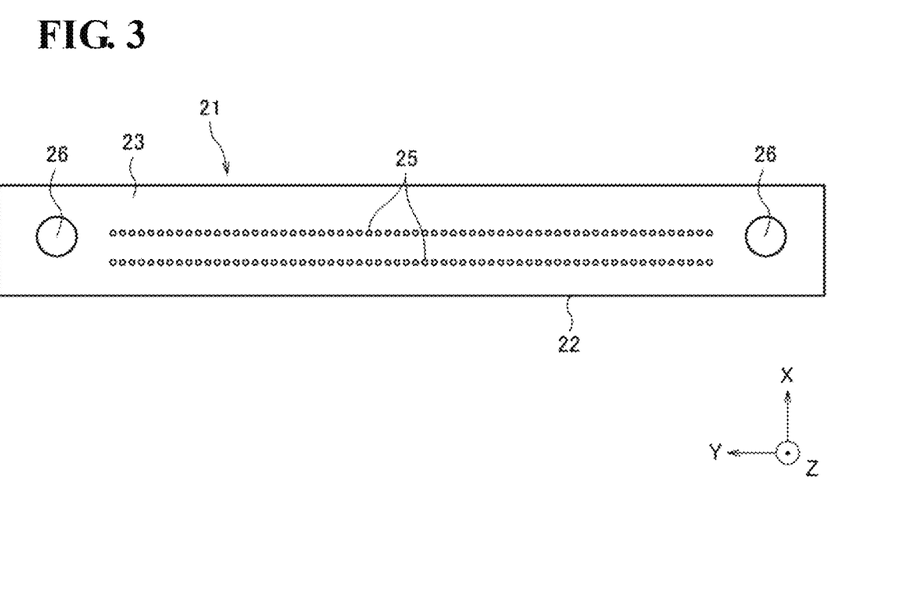
FIG. 3 is a front view of a glass plate included in the optical connection component illustrated in FIG. 1.
Figure 4:
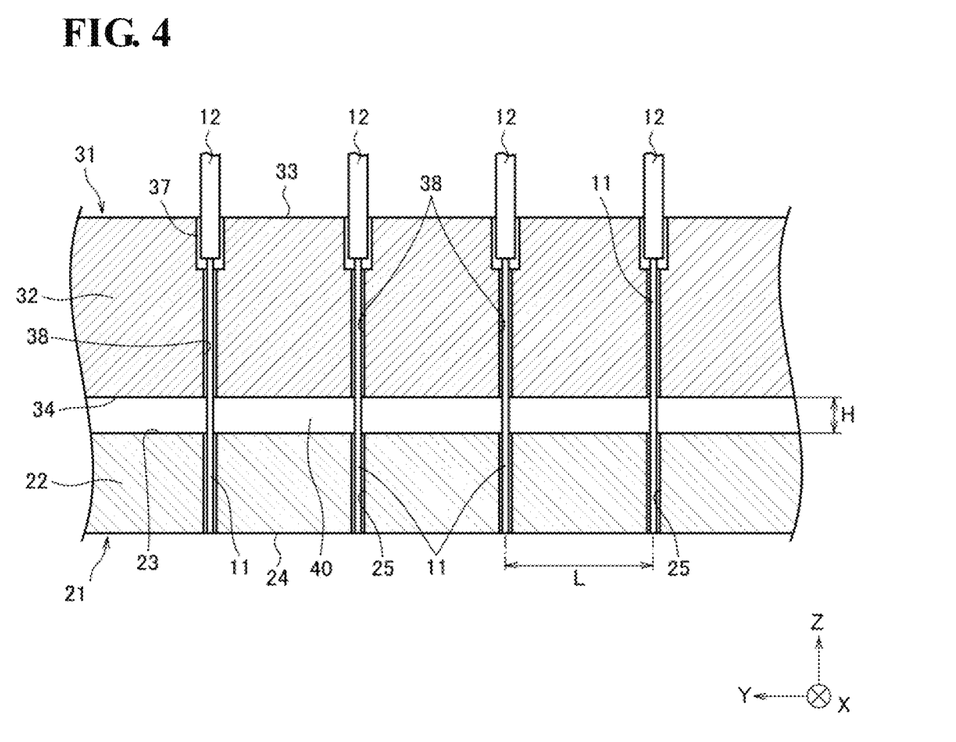
FIG. 4 is an IV-IV arrow sectional view of the optical connecting component illustrated in FIG. 1.

FIG. 1 is an external perspective view of the optical connection component 1 according to the first embodiment of the present disclosure, FIG. 2 is an exploded perspective view of the optical connection component illustrated in FIG. 1, FIG. 3 is a front view of a glass plate included in the optical connection component illustrated in FIG. 1, FIG. 4 is a IV-IV line arrow sectional view of the optical connection component illustrated in FIG. 1. The optical connection component 1 is used to optically connect, for example, an electronic substrate including an optical integrated circuit chip or the like to a premises wiring (or external transmission path).

As illustrated in FIG. 1, the optical connection component 1 includes a fiber ribbon 10 and a fiber ribbon 10a stacked on the fiber ribbon 10. The fiber ribbons 10 and 10a both have a bent portion in the middle, one end of the fiber ribbons 10 and 10a is fixed to the electronic substrate via the fiber fixing part 20, the other end of the fiber ribbons 10 and 10a is to be connected to the premises wiring via a connector (not illustrated).

The fiber fixing part 20 includes a multi-hole glass plate 21 and a multi-hole resin ferrule 31. Note that the multi-hole glass plate 21 corresponds to the glass plate of the present disclosure, and the multi-hole resin ferrule 31 corresponds to the resin ferrule of the present disclosure, respectively.

As illustrated in FIG. 2, the multi-hole glass plate 21 has, for example, a rectangular parallelepiped-shaped glass plate body 22. The glass plate body 22 is capable of transmitting ultraviolet rays, a rectangular surface 23 is oppositely disposed on a back surface 34 of the multi-hole resin ferrule 31, and the rectangular back surface 24 is oppositely disposed on the electronic substrate. This back surface 24 is secured to the electronic substrate using UV adhesive. The surface 23 corresponds to the first surface of the present disclosure, and the back surface 24 corresponds to the second surface of the present disclosure.

The thickness (length along Z direction in the drawing) between the surface 23 and the back surface 24 of the glass plate body 22 is as thin as about 1 mm, for example, and the glass plate body 22 has first through holes 25 penetrating the surface 23 and the back surface 24. As illustrated in FIG. 3, the first through holes 25 are a plurality of through holes, and are two-dimensionally arranged, for example, along the width direction (Y direction in the drawing) and the length direction (X direction in the drawing) of the glass plate body 22.

The first through holes 25 can be created by using a process combining photolithography and dry etching such as reactive ion etching (RIE) or, a hole drilling technique using a laser. However, as long as positions of the holes have an error of 1 μm or less with respect to predetermined design positions, and an inner diameter of the holes has a deviation of ±1 µm or less with respect to a predetermined diameter, a method to create the first through holes 25 is not limited to the above technique. Although an example of the glass plate body 25 that has a plurality of first through holes 25 has been described, the glass plate body 25 that has single first through hole 25 may be used. In this case, the fiber ribbon 10 and the fiber ribbon 10a each are single optical fiber.

In this manner, since the multi-hole glass plate 21 transmits UV light, the multi-hole glass plate 21 can be fixed to an optical integrated circuit such as a Si—PIC circuit using UV adhesive. Further, if the positioning structure to the optical integrated circuit is constituted by the glass plate and the resin ferrule fixed to the glass plate, the position and the diameter of the long through hole can be formed with high accuracy.

Since the first through holes 25 can be two-dimensionally arranged in the multi-hole glass plate 21, the optical connection component 1 having a high channel density can be obtained. Specifically, an optical connecting component having high channel density in which a ratio n/S (the number n of mounted fibers to the area S of the multi-hole glass plate 21) exceeds 10/mm$^2$ can obtain.

Further, the glass plate body 22 has guide holes 26 near both ends of the glass plate body 22 with respect to the Y direction. The multi-hole resin ferrule 31 also has guide holes (not illustrated), and the guide pins 50 illustrated in FIG. 2 can be passed through the guide holes 26 and the guide holes of the multi-hole resin ferrule 31, respectively. As a result, the first through holes 25 and the second through holes 38, which will be described with reference to FIG. 4, of the multi-hole resin ferrule 31, can be easily aligned with each other.

The guide pins 50 may be pulled out from the multi-hole glass plate 21 or the multi-hole resin ferrule 31 after fixing the multi-hole glass plate 21 and the multi-hole resin ferrule 31. If the guide pins 50 remain in the multi-hole glass plate 21 and the multi-hole resin plate 31 without pulling out from them, the fiber ribbon 10 is bent and receive a shearing force, when the difference between the thermal expansion coefficient of the multi-hole resin ferrule 31 and the thermal expansion coefficient of the multi-hole glass plate 21 is large.

As illustrated in FIG. 2, the multi-hole resin ferrule 31 has a substantially L-shaped ferrule body 32 in a side view and is placed on the multi-hole glass plate 21. Ferrule body 32 has a surface 33 receiving the fiber ribbon 10a, and a back surface 34 that is oppositely disposed on the surface 23 of the glass plate body 22 at one end side of the surface 33. The multi-hole resin ferrule 31 has a front face 35 facing the bent portion 13 of the fiber ribbons 10 and 10a at one end of the surface 33 of the ferrule body 32. Further, the ferrule body 32 has side faces 36 that face each side end of the fiber ribbon 10 and 10a on the sides of the surface 33 of the ferrule body 32.

As illustrated in FIG. 4, the thickness from the surface 33 to the back surface 34 (length in the Z direction in FIG. 4) of the ferrule body 32 is greater than the thickness (1 mm) from the surface 23 to the back surface 24 of the glass body 22. The ferrule body 32 has a plurality of second through holes 38 penetrating the surface 33 and the back surface 34. Like the first through holes 25, the second through holes 38 are disposed two-dimensionally along the width direction (Y direction in the drawing) and the length direction (X direction in the drawing) of the ferrule body 32.

The diameter of the second through holes 38 and the diameter of the first through holes 25 of the multi-hole glass plate 21 are larger than the outer diameter of the glass fibers 11 exposed from the tip of the fiber ribbon. The glass fibers 11 are inserted through the second through holes 38 and the first through holes 25. The second through holes 38 include fiber retention holes 37 that can loosely fit the individual coating resin layer 12 of the optical fibers near the surface 33 of the ferrule body 32.

A material of the multi-hole resin ferrule 31 may be polyphenylene-sulfide (PPS) or polyetherimide (PEI). These resins do not denature in the range of −40° C. to +85° C., where optical components are normally used, and are highly durable to humidity. Further, these resins have a good fluidity, and have a characteristic of being relatively easy to be mold. Thus, since the multi-hole resin ferrule 31 can be molded in various shapes, it is possible to easily meet the requirements to an optical connection component such as changing the optical path direction or reducing the height of the optical connection component.

Although an example of the multi-hole resin ferrule having the substantially L-shaped ferrule body 32 has been described, various shapes can be adopted for portions other than the back surface 34 disposed to face the front surface 23 of the glass plate body 22. For example, it is not limited to a shape applicable to a bent optical fiber illustrated in FIG. 1; it may be a shape applicable to a linear optical fiber that is not bent.

As illustrated in FIG. 2, the fiber ribbons 10 and 10a have a plurality of glass fibers 11 arranged along the Y direction in the drawing. The glass fibers 11 have a core and a cladding made of quartz-based glass, and an outer diameter of the glass fibers 11 are, for example, 100 µm or less. Incidentally, the glass fibers 11 may be single-core optical fibers having a single core or multi-core optical fibers including glass fibers having a plurality of cores.

An individual coating resin layers 12 are provided on the outer side of the glass fibers 11, and the periphery of the individual coating resin layers 12 is covered with a collective coating resin layer 14 at the rear side of the bent portion 13, that is, in the positive direction of X in the drawing.

Incidentally, in order that the glass fiber 11 can be applied to a flexible bending shape, the glass fiber 11 is desirable to be a low bending loss fiber. To create a low-bending-loss fiber, an optical fiber having a strong confinement of light to the core by applying a refractive index structure having a high refractive index core or called a trench structure is suitably used. In addition, the glass fiber 11 can be formed by appropriately adding dopants for controlling refractive index to $SiO_2$ glass. The central core may consist of a $SiO_2$ glass added with $GeO_2$, the optical cladding may consist of pure $SiO_2$ glass, or a $SiO_2$ glass added with fluorine, and the jacket may consist of pure $SiO_2$ glass. Thus, it is possible to obtain an optical fiber with good economic efficiency and profile controllability. The jacket portion may or may not include Cl. The central core may also be co-added with $GeO_2$ and F.

In addition, in order to increase strength of the optical fiber, a method of performing carbon coating on the outer periphery of the glass fiber 11 and a method of adjusting the thermal history at the time of drawing and applying a compressive strain to the outer periphery of the glass fiber 11, and the like can suitably combined.

The bent optical fiber illustrated in FIG. 1 may be bent by heating in advance. As the heating means, burners, $CO_2$ lasers, arc discharges, heaters, and the like can be used.

The $CO_2$ laser has favorable characteristics for precise control of curvature distributions because an irradiation strength, irradiation range, and irradiation time can be easily adjusted. Since the glass is opaque near 10 which is a typical wavelength of the $CO_2$ laser, it is considered that the irradiation energy of the $CO_2$ laser is absorbed by the surface layer of the glass fiber 11, and the irradiation energy is transmitted by re-radiation and thermal conduction. If the power of the $CO_2$ laser is too high, the surface temperature of the glass fiber 11 rises abruptly to the temperature at which the glass evaporates, and the shape of the glass fiber 11 cannot be maintained. Therefore, the irradiating power of the $CO_2$ laser is appropriately adjusted so that the glass of the surface layer of the glass fiber 11 does not evaporate and the cross-section of the glass fiber 11 to be heated rises to a temperature equal to or higher than the working point ($10^3$ Pa·S) for a predetermined time to remove the distortion. When bending with a $CO_2$ laser, a cooling speed of the glass fiber 11 should be slow such as $10^{4\circ}$ C./s or less to remove distortion.

As illustrated in FIG. 4, the opening of the first through holes 25 located on the surface 23 of the multi-hole glass plate 21 and the opening of the second through hole 38 located on the back surface 34 of the multi-hole resin ferrule 31 provided coaxially with the first through holes 25 are separated by a distance H. An air gap 40, for example, exists around each of the glass fibers 11 and between adjacent glass fibers 11 between the surface 23 of the multi-hole glass plate 21 and the back surface 34 of the multi-hole resin ferrule 31.

Figure 6:
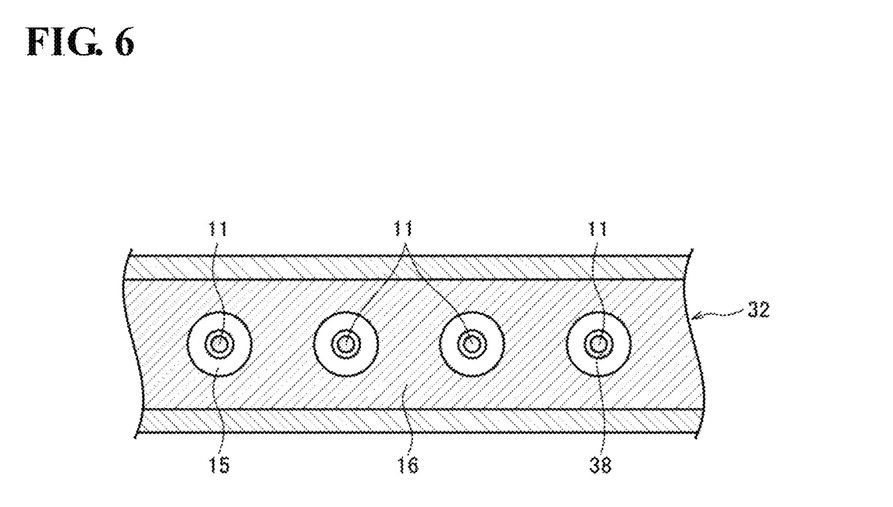
FIG. 6 is a cross-sectional view between the glass plate and the resin ferrule in a modification of the first embodiment.

FIG. 6 is a cross-sectional view between the multi-hole glass plate 21 and the multi-hole resin ferrule 31 in the modification of the first embodiment. As in the modification example, a resin having a Young's modulus of 100 MPa or less may be filled in the regions 16 between the adjacent glass fibers 11 and excluding the circumference 15 of the glass fibers 11.

When contacting the multi-hole glass plate 21 and the multi-hole resin ferrule 31 without a gap, the glass fibers 11 between the first through holes 25 and second through holes 38 are applied with a shearing force due to the difference between the thermal expansion coefficient of the multi-hole glass plate 21 and the thermal expansion coefficient of the multi-hole resin ferrule 31 accompanying to a temperature change. Thus, the optical fiber may be disconnected. However, as described above, the surface 23 of the multi-hole glass plate 21 and the back surface 34 of the multi-hole resin ferrule 31 are separated by the distance H to provide a margin for the glass fibers 11 to bend. Therefore, the shearing force associated with the temperature change is less likely to be applied to the glass fiber 11; it is possible to prevent breakage of the optical fiber between the first and second through holes 25 and 38.

Further, if the diameter of the first and second through holes 25 and 38 is larger than the diameter of the glass fibers 11, even if there is a temperature change of −40° C. to 85° C., since contact of the first and second through holes 25 and 38 and the glass fibers 11 can be easily avoided. This point also contributes to preventing a breakage of the optical fibers.

Figure 5:
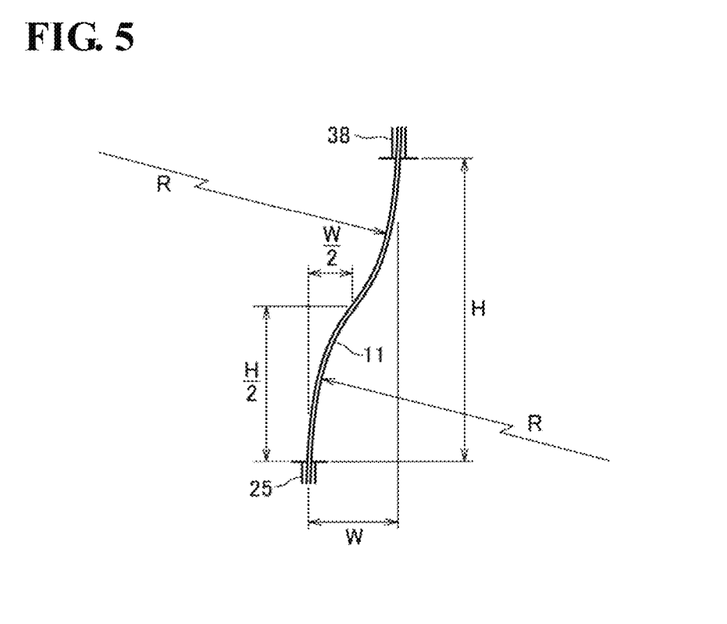
FIG. 5 is a conceptual diagram for explaining a glass fiber disposed between a glass plate and a resin ferrule in the optical connection component illustrated in FIG. 1.

Next, determine the interval H that can prevent breakage of the optical fiber. FIG. 5 is a conceptual diagram for explaining a glass fiber disposed between a glass plate and a resin ferrule in the optical connection component illustrated in FIG. 1.

As described above, when there is a difference between the thermal expansion coefficient of the multi-hole glass plate 21 and the thermal expansion coefficient of the multi-hole resin ferrule 31, the glass fiber 11 positioned between the first through holes 25 and the second through holes 38 is bent.

The difference between the thermal expansion coefficient of the multi-hole glass plate 21 and the thermal expansion coefficient of the multi-hole resin ferrule 31 is denotes as ΔC (1/° C.), and the pitch of the first through holes 25 (which is the same as the second through holes 38) is denoted as L(m). Further, as illustrated in FIG. 5, the error in the relative hole position between the first through holes 25 and the second through holes 38 generated by the difference ΔC and the temperature change of the thermal expansion coefficient is denoted as W (m). The temperature change is assumed to be −40° C. to +85° C., and the amount of change is 125° C. Therefore, W can be expressed as W=−ΔC×L×125/2 (Equation 1).

The radius of the glass fiber 11 is denoted as d (m), the radius of curvature of the glass fiber 11 is denoted as R (m), the Young's modulus of the glass fiber 11 is denoted as E (Pa), and the target value of the tensile stress applied to the glass fiber 11 is denoted as σ (Pa); R can be expressed as R=σ×d/E (Equation 2).

Then, at the position of the interval H (m), it is considered that the glass fibers 11 of the radius of curvature R are connected in series, R sin θ=H/2, and R cos θ=R−W/2. Therefore, by removing θ, spacing H is derived as H=2R sin(cos$^{-1}$(1−W/2R)). W and R can be obtained from Equations 1 and 2.

Thus, if the spacing H satisfies the following inequality:

$$H \geq 2R \sin(\cos^{-1}(1-W/2R)), \quad \text{(Equation 3)}$$

the tensile stress applied to the glass fiber 11 can be suppressed to the target value, and breakage of the optical fiber between the multi-hole glass plate 21 and the multi-hole resin ferrule 31 can be prevent.

The target value σ of the tensile stress is preferably 2000 MPa or less (and is more preferably 1000 MPa or less).

The target values σ of the tensile stresses can be measured by OFDR method (see Optics Letters vol. 41 No. 12, pages 2819 to 2822). Also by measuring the radius of curvature R of the glass fiber 11 using X-ray CT, the target value σ of the tensile stress can be obtained by using an equation: σ=E× R/d, which is deformation of equation 2.

Figure 7:
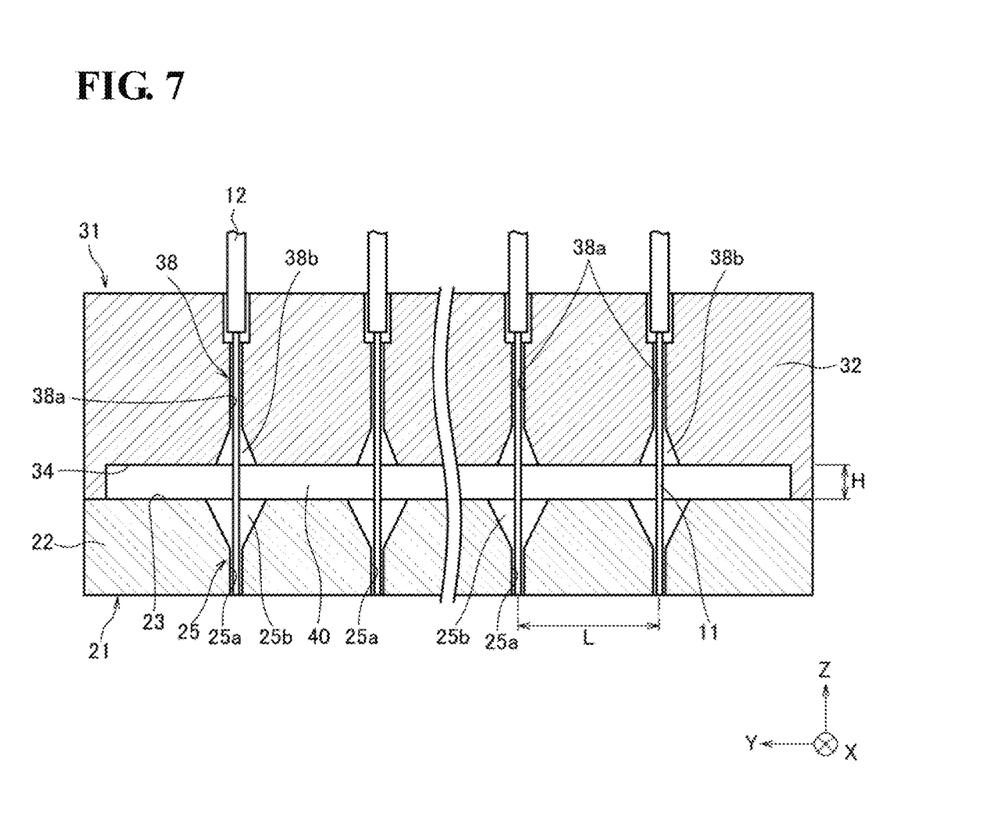
FIG. 7 is a cross-sectional view of an optical connection component according to the second embodiment.

FIG. 7 is a cross-sectional view of an optical connection component according to the second embodiment. In the first embodiment, an example in which the first and second through holes 25 and 38 are straight holes has been described, but the present invention is not necessarily limited to this example. For example, as illustrated in FIG. 7, the first through holes 25 provided in the glass plate body 22 have straight sections 25a for inserting the glass fibers 11, and tapered sections 25b that are enlarged in diameter toward the surface 23 of the glass plate body 22. Further, the second through holes 38 provided in the ferrule body 32 have straight sections 38a for inserting the glass fibers 11, and tapered sections 38b that are enlarged in diameter toward the back surface 34 of the ferrule body 32.

Thus, by providing the tapered sections 25b, 38b, the distance between the opening of the first through holes 25 and the opening of the second through holes 38 become larger than the distance H from the surface 23 of the glass plate body 22 to the back surface 34 of the ferrule body 32 as long as the tapered sections 25b and 38b, thus, the shearing force applied to the glass fibers 11 can be reduced.

Figure 8:
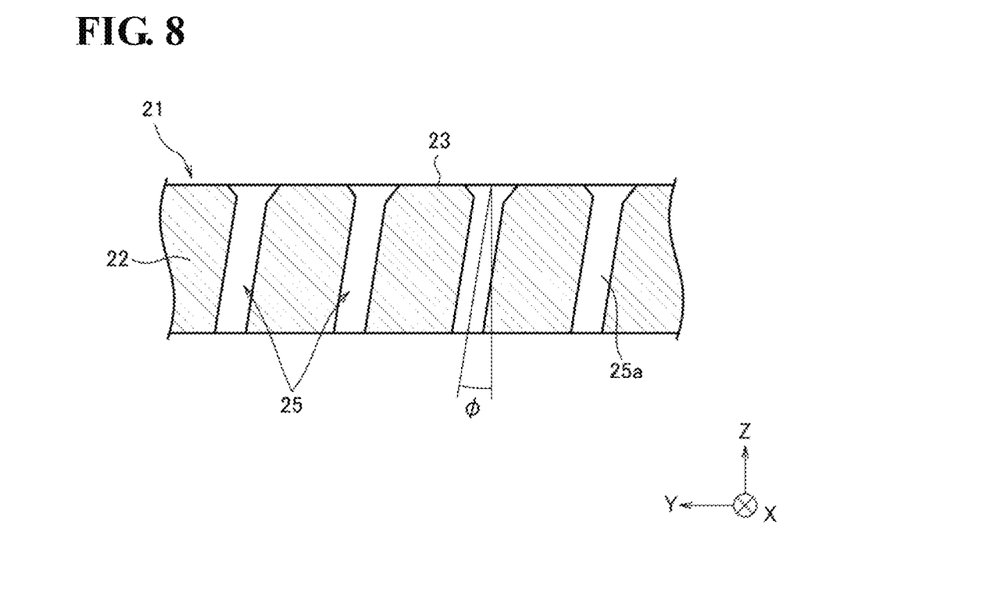
FIG. 8 is a cross-sectional view of a glass plate included in an optical connection component according to the third embodiment.

FIG. 8 is a cross-sectional view of a glass plate included in the optical connection component according to the third embodiment. In the first embodiment and the second embodiment, an example having the first through holes 25 extending in the direction perpendicular to the surface 23 of the glass plate body 22 is described. However, the first through holes 25 may have straight sections 25a inclined by, for example, about 8 degrees with respect to a line perpendicular to the surface 23. Thus, it is possible to suppress the reflection at the connection interface between the electronic substrate.

The embodiments disclosed herein are to be considered in all respects as illustrative and not restrictive. The scope of the present disclosure is indicated by the claims, not by the meaning set forth above, and is intended to include all modifications within the meaning and scope equivalent to the claims.

What is claimed is:

1. An optical connection component comprising:
   a glass plate formed of a glass material capable of transmitting ultraviolet rays, the glass plate having a first surface, a second surface opposite to the first surface, and a plurality of first through holes penetrating from the first surface to the second surface;
   a resin ferrule fixed to the first surface of the glass plate and having a plurality of second through holes each having a central axis coaxial with a central axis of the plurality of first through holes; and
   a plurality of optical fibers including a glass fiber and a resin coating covering an outer periphery of the glass fiber, wherein
   the glass fiber exposed from the resin coating at a tip end of each of the plurality of optical fibers is received in the plurality of first through holes and the plurality of second through holes;
   wherein the plurality of first through holes and the plurality of second through holes respectively face each other with a gap therebetween, and an air gap is present in a region in contact with each of the plurality of glass fibers between the glass plate and the resin ferrule, and
   a resin is filled in a region between the glass plate and the resin ferrule except a region in contact with each of the glass fibers.

2. The optical connection component according to claim 1, wherein
   openings of the plurality of first through holes and openings of the plurality of second through holes are separated from each other.

3. The optical connection component according to claim 1, wherein
   a tensile stress applied to a portion of the glass fiber disposed between the glass plate and the resin ferrule is 2000 MPa or less.

4. The optical connection component according to claim 1, wherein
   openings of the plurality of first through holes and openings of the plurality of second through holes are larger than an outer diameter of the glass fiber.

5. The optical connection component according to claim 1, wherein
   the optical connection component has the plurality of first through holes two-dimensionally arranged in one cross section of the glass plate.

6. The optical connection component according to claim 1, wherein
   the glass plate and the resin ferrule each have guide holes positioned coaxially with each other.

7. The optical connection component according to claim 1, wherein
   an outer diameter of the glass fiber is 100 µm or less.

8. The optical connection component according to claim 1, wherein
   the plurality of optical fibers are respectively a plurality of multi-core optical fibers including glass fibers having a plurality of cores in one cladding.

9. The optical connection component according to claim 1, wherein
   the resin has a Young's modulus of 100 MPa or less.

10. The optical connection component according to claim 1, wherein
    each of the first through holes has a tapered section that is enlarged in diameter toward the first surface, and
    each of the second through holes has a tapered section that is enlarged in diameter toward a surface of the ferrule facing the first surface.

* * * * *